(12) United States Patent
O'Donnell

(10) Patent No.: US 9,514,548 B2
(45) Date of Patent: Dec. 6, 2016

(54) METHOD AND SYSTEM FOR PRESENTING AND USING FOUR DIMENSIONAL DATA FROM A MEDICAL IMAGING SYSTEM

(71) Applicant: Siemens Medical Solutions USA, Inc., Malvern, PA (US)

(72) Inventor: Thomas O'Donnell, New York, NY (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 7 days.

(21) Appl. No.: 14/678,257

(22) Filed: Apr. 3, 2015

(65) Prior Publication Data

US 2016/0292891 A1 Oct. 6, 2016

(51) Int. Cl.
*G09G 5/02* (2006.01)
*G06T 11/00* (2006.01)
*G06T 7/00* (2006.01)
*G06T 11/20* (2006.01)

(52) U.S. Cl.
CPC ........... *G06T 11/001* (2013.01); *G06T 7/0014* (2013.01); *G06T 11/203* (2013.01); *G06T 2207/10072* (2013.01); *G06T 2207/30004* (2013.01); *G06T 2210/41* (2013.01); *G06T 2211/40* (2013.01); *G06T 2215/16* (2013.01)

(58) Field of Classification Search
CPC .............................. G06T 11/001; G06T 7/0014
USPC .......................................................... 345/589
See application file for complete search history.

(56) References Cited

U.S. PATENT DOCUMENTS

2008/0137803 A1* 6/2008 Wu ......................... A61B 6/032
378/5
2014/0270440 A1* 9/2014 Inglese ................. A61B 6/4241
382/131

\* cited by examiner

*Primary Examiner* — Gregory J Tryder
*Assistant Examiner* — Yuehan Wang

(57) ABSTRACT

A method of presenting higher dimensional data provided from a photon counting CT system includes receiving data from a photon counting CT system corresponding to materials exposed to N number of ranges of photon energy, where N is a number equal to or greater than four and generating N number of images, each image comprising pixel values corresponding to the materials exposed to the N number of ranges of photon energy. The method also includes presenting the pixel values in each of the N number of images within a two dimensional (2D) space by providing N number of axes, each axis linearly representing the pixel values in a corresponding image of the N number of images and representing each pixel value for pixels corresponding to a same location in each of the N number of images via a continuous line comprising a plurality of line segments.

14 Claims, 7 Drawing Sheets

US 9,514,548 B2

METHOD AND SYSTEM FOR PRESENTING AND USING FOUR DIMENSIONAL DATA FROM A MEDICAL IMAGING SYSTEM

TECHNOLOGY FIELD

The present application relates generally to methods and systems for presenting higher dimensional data provided from a medical imaging system, and in particular, to methods and systems for acquiring four dimensional data provided from a quad energy photon counting CT system and presenting the four dimensional data within a two dimensional (2D) space to facilitate visually distinguishing between different scanned materials. Embodiments may include acquiring four or more dimensions and presenting the four or more dimensional data, within the 2D space to facilitate visually distinguishing between different scanned materials.

BACKGROUND

Medical imaging may be used to create images of the human body. Conventional medical imaging modalities include radiography (e.g., X-rays), fluoroscopy, magnetic resonance (MR), ultrasound and nuclear medicine (e.g., positron emission tomography (PET) and single-photon emission tomography (SPET). Imaging methods may use computer assisted tomography (CT), which employs tomography created by computer processing. CT methods include X-ray CT, single-photon emission computed tomography (SPECT) and positron emission tomography (PET-CT) and Photon Counting CT.

Photon Counting CT includes detectors that utilize energy bins for counting photons in different energy ranges to simultaneously acquire a plurality of images, each corresponding to material exposed to a different level of photon energy. Accordingly, Photon Counting CT may be utilized to differentiate between different types of materials (e.g., materials in anatomy) within one scan.

In a conventional dual energy CT system, anatomy is exposed to two different ranges of photon energy (e.g., a low range and a high range). Each image shows a portion of anatomy exposed to one of the two different ranges of the photon energy. Data (e.g., luminance intensities of pixels corresponding to materials in the anatomy exposed to the two energy ranges) acquired from each image is typically displayed using a 2D scatter plot. The 2D plot is used to distinguish between different materials in anatomy exposed to the low energy range and high energy range.

SUMMARY

Embodiments provide a method of presenting higher dimensional data provided from a photon counting CT system. The method includes receiving, via a processor, data from a photon counting CT system, the data corresponding to one or more materials exposed to N number of ranges of photon energy, where N is a number equal to or greater than four and generating, via the processor, N number of images, each image comprising pixel values corresponding to the one or more materials exposed to the N number of ranges of photon energy. The method also includes presenting one or more of the pixel values in each of the N number of images within a two dimensional (2D) space by providing N number of axes, each axis linearly representing the pixel values in a corresponding image of the N number of images and representing each pixel value for pixels corresponding to a same location in each of the N number of images via a continuous line comprising a plurality of line segments, the continuous line intersecting points along each of the N number of axes.

According to an embodiment, the one or more of the pixel values in each of the N number of images are presented within the 2D space via the processor.

According to an embodiment, presenting one or more of the pixel values in each of the N number of images within the 2D space further includes providing a first line cluster comprising a first plurality of continuous lines. Each of the first plurality of continuous lines intersecting points along each of the N number of axes and corresponding to a first material exposed to N number of ranges of photon energy.

In one embodiment, the method further includes providing a material classifier, the material classifier identifying a material of the one or more materials according to exposure to the N number of ranges of photon energy by the location of the first line cluster within the 2D space.

In another embodiment, the one or more materials is within an anatomy of a patient exposed to the N number of ranges of photon energy and the method further includes comparing a material selected from the one or more materials within the anatomy to the material classifier and determining whether the selected material is the material identified by the material classifier based on the comparing.

In an aspect of an embodiment, presenting one or more of the pixel values in each of the N number of images within the 2D space further includes providing a second line cluster comprising a second plurality of continuous lines, each of the second plurality of continuous lines intersecting points along each of the N number of axes and corresponding to a second material exposed to N number of ranges of photon energy. The second line cluster is spaced from the first line cluster in the 2D space.

In another aspect of an embodiment, the method further includes determining two or more materials exposed to N number of ranges of photon energy based on the location of the first line cluster and the second line cluster.

According to an embodiment, the method further includes performing a Photon Counting CT scan using the N number of ranges of photon energy based on the determination of two or more materials exposed to N number of ranges of photon energy.

According to an aspect of an embodiment, each of the N number of axes comprises a different color.

In one embodiment, one or more of the line segments includes an identifier indicating an uncertainty in the pixel values of one or both of the adjacent axes intersecting the one or more line segments.

In yet another embodiment, the N number of axes are spaced from each other at relative distances to indicate corresponding relative differences in the N number of ranges of photon energy.

Embodiments provide a method of classifying material scanned using a photon counting CT system. The method includes performing a scan of a predetermined material exposed to N number of ranges of photon energy, where N is a number equal to or greater than four, generating, via a processor, N number of images, each image comprising pixel values corresponding to the predetermined material exposed to the N number of ranges of photon energy and presenting one or more of the pixel values in each of the N number of images within a two dimensional (2D) space by providing N number of axes, each axis linearly representing the pixel values in a corresponding image of the N number of images and providing a line cluster comprising a plurality of continuous lines comprising a plurality of line segments and using the presented line cluster to classify the predetermined material as a material classifier according to exposure to the N number of ranges of photon energy and the location of the line cluster within the 2D space. The plurality of continuous lines (i) representing pixel values corresponding to a same location in each of the N number of images and (ii) intersecting points along each of the N number of axes and corresponding to the predetermined material exposed to N number of ranges of photon energy, each of the points indicating a pixel value of the predetermined material in each corresponding image.

In one embodiment, the pixel values are luminance intensities, and the line cluster in the material classifier are equal to or within a luminance intensity range.

In another embodiment, the luminance intensity range is defined by a minimum luminance intensity value and maximum luminance intensity value along each of the N number of axes and the number of continuous lines in the material classifier are equal to or within the luminance intensity range.

According to an embodiment, the material classifier is configured to be compared to pixel data of a material in the N number of images from a scanned anatomy to determine whether the material is the predetermined material identified by the material classifier.

Embodiments provide a method of distinguishing between different types of material exposed to ranges of photon energy. The method includes performing a scan of a first material and a second material exposed to N number of ranges of photon energy, where N is a number greater than four. The method also includes generating, via a processor, N number of images. Each image includes pixel values corresponding to the first material and the second material exposed to the N number of ranges of photon energy. The method also includes presenting one or more of the pixel values in each of the N number of images within a two dimensional (2D) space by providing N number of axes, each axis linearly representing the pixel values in a corresponding image of the N number of images, providing a first line cluster comprising a first plurality of continuous lines, and providing a second line cluster comprising a second plurality of continuous lines, the second plurality of continuous lines (i) representing pixel values corresponding to a same location in each of the N number of images and (ii) intersecting points along each of the N number of axes and corresponding to the second material exposed to N number of ranges of photon energy, each of the points indicating a pixel value of the second material in each corresponding image. The first plurality of continuous lines (i) representing pixel values corresponding to a same location in each of the N number of images and (ii) intersecting points along each of the N number of axes and corresponding to the first material exposed to N number of ranges of photon energy, each of the points indicating a pixel value of the first material in each corresponding image. The method also includes determining the first material and the second material exposed to the N number of ranges of photon energy to be visually distinct based on the appearance of the first line cluster and the second line cluster in the 2D space.

In one embodiment, the first material and the second material are determined to be visually distinct based on a distance between the first line cluster and the second line cluster in the 2D space.

In another embodiment, the scan of the first material and the second material exposed to N number of ranges of photon energy is a scan of an organ of anatomy and the method further comprises determining to perform a second scan of the organ at the N number of ranges of photon energy when the first line cluster and the second line cluster in the 2D space appear visually distinct.

In yet another embodiment, the scan of the first material and the second material exposed to N number of ranges of photon energy is a scan of an organ of anatomy using a predetermined contrast agent and the method further includes determining to scan the organ of anatomy at the N number of ranges of photon energy using the predetermined contrast agent based when the first line cluster and the second line cluster in the 2D space appear visually distinct.

BRIEF DESCRIPTION OF THE DRAWING

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

Figure 1:
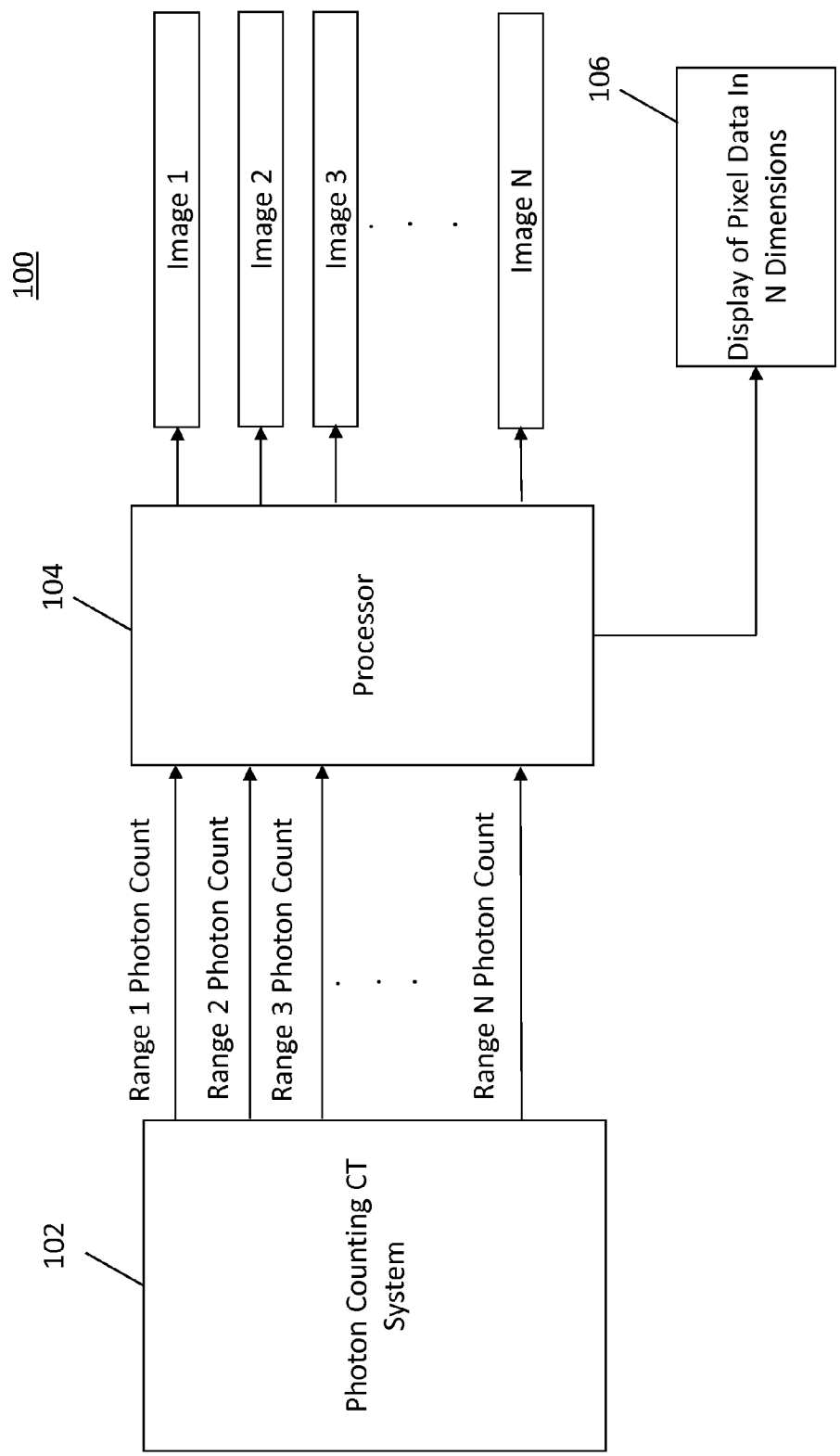
FIG. 1 is a system flow diagram of an exemplary multi-dimensional display system according to embodiments disclosed herein.

There is a continuing need for imaging methods that provide better visual presenting (e.g., electronic displaying) of data in a higher number of dimensions (e.g., four or more dimensions).

Embodiments of the present disclosure provide systems and methods for presenting higher dimensional data (e.g., data in four or more dimensions) acquired using Photon Counting CT that exposes anatomy to four or more ranges of photon energy.

In a quad energy photon counting CT system, anatomy is exposed to four different ranges of photon energy. Each image corresponds to materials in the anatomy exposed to one of the four different ranges of photon energy. It is difficult, however, to visually display data (e.g., pixel data) in four dimensions. Accordingly, it is difficult to visually display the pixel data corresponding to the four different ranges of photon energy such that the different materials exposed to the four different energy levels are easily distinguishable by their appearance.

Embodiments of the present disclosure provide systems and methods for visually presenting (e.g., electronically displaying, manually drawing), within a 2D space, higher dimensional (four or more dimensions) image data corresponding to the material exposed to four different ranges of photon energy. Each dimension (each image) may be visually displayed as a linear axis to represent different pixel values (e.g., luminance intensities) that correspond to the materials exposed to corresponding ranges of photon energy.

For example, some embodiments include systems and methods for visually displaying image data acquired in a photon counting CT medical imaging system to distinguish between different materials in anatomy exposed to different ranges of photon energy (e.g., four ranges). Embodiments utilize clustering of lines representing pixel intensities of different images to distinguish between different materials exposed to different energy ranges.

Embodiments include systems and methods of visually displaying, in a 2D space, pixel data from three or more images corresponding to materials in anatomy to determine whether one or more materials are in the scanned anatomy. Embodiments classify appearances of different materials (hereinafter material classifiers) displayed in the 2D space according to their exposure to different numbers of photon energy ranges (e.g., four energy ranges). The classifiers may then be used to determine whether the one or more materials exposed to the corresponding number of photon energy ranges are in the scanned anatomy.

Embodiments include systems and methods of displaying multidimensional data in a 2D space to determine whether to use Photon Counting CT to scan a particular portion (e.g., an organ) of a patient's anatomy. The determination of whether to use Photon Counting CT may include determining whether materials exposed to a particular number of ranges of photon energy (e.g. four ranges) appear different from each other in the particular number of images. The determination of whether to use Photon Counting CT may include determining whether to use a particular contrast agent in a Photon Counting CT scan.

It is often helpful to distinguish between different materials in anatomy, which may include tissue, contrast agents such as iodine and gadolinium and nanoparticles used in some contrast agents. Different materials (e.g., iodine, tissue, and nanoparticles) may appear different in an image when each material is exposed to photons at different energies. For example, iodine appears brighter when it is exposed to lower energy photons as compared to higher energy photons. Soft tissue appears about the same in the high energy photon and the low energy photon. The pixels in an image that appear brighter in the low energy, but darker in the high energy, may be identified as pixels corresponding to iodine.

In a conventional dual energy CT system, each image corresponds to anatomy exposed to one of the two ranges of photon energies. A 2D scatter plot (e.g., a plot having a horizontal axis representing one energy range and a vertical axis to represent the other energy range) may be used to distinguish between different materials in anatomy exposed to the low energy range and high energy range based on clustering of different materials at different locations in the plot. The intensity levels for each pixel in both the low energy image and the high energy image are plotted in the 2D scatter plot. If the pixels represent soft tissue (e.g., appearing as about the same intensity in both images), the pixels cluster (line up) on a diagonal. If the pixels represent iodine (e.g., appearing as different intensities in both images), the pixels cluster at different areas of the scatter plot. Accordingly, the different materials may be easily distinguished via the clustering in the scatter plot.

As described above, in a quad energy photon counting CT system, anatomy is exposed to four different ranges of photon energy. For example, each range of photon energy may be equal to or less than one of four different energy threshold values and the pixels in each image correspond to the anatomy exposed to one of the four different ranges of photon energy. It is difficult to visually display pixel data (e.g., luminance intensity of pixels) corresponding to different materials in anatomy exposed to the four different energy ranges such that the different materials are easily distinguishable.

Embodiments described herein include systems and methods that visually display data in higher amounts of dimensions (e.g., four or more dimensions) such that the different materials are easily distinguishable. For example, embodiments provide four dimensional (4D) scatter plotting of the image data acquired from a quad energy Photon Counting CT system. Embodiments may, however, display image data acquired using any number of photon energy levels.

FIG. 1 is a system flow diagram of an exemplary multi-dimensional display system 100 which may be used with embodiments disclosed herein. As shown in FIG. 1, the system 100 may include a Photon Counting System 102 configured to provide radiation at different photon energies to the anatomy of a patient. The system 100 may also include a processor 104 configured to receive data from Photon Counting System 102. The data may include the number of photons (Photon Count) corresponding to each of N number of photon energy ranges (Range 1, Range 2, Range 3, . . . Range N). Based on the received information, the processor 104 provides N number of images (Image 1, Image 2, Image 3, . . . Image N). Each image includes pixels having pixel values, such as luminance intensities, corresponding to different materials in the anatomy of the patient exposed to corresponding ranges of photon energy. That is each image corresponds to a different photon energy range (e.g., photons having energies equal to or within a range defined by a minimum energy level and a maximum energy level).

In some embodiments, the processor 104 may be configured to present (e.g., electronically display) the N-Dimensional pixel data (e.g., pixel values from each of the N number of images) in a 2D space at display 106. In some embodiments, a different processor (not shown) may display the N-Dimensional pixel data from the N images within the 2D space. The N-Dimensional pixel data may be displayed within the 2D space according to embodiments described herein. The N-Dimensional pixel data may be displayed such that materials may be distinguished from each other based on their different appearances when exposed to N number of photon energy ranges.

In some embodiments, the N-Dimensional pixel data may be automatically displayed within the 2D space by a processor. That is the processor may analyze the N-Dimensional pixel data and automatically display the N-Dimensional pixel data within the 2D space. In some embodiments, the N-Dimensional pixel data may be displayed within the 2D space by a processor in response to receiving the N-Dimensional pixel data via a user input. In some embodiments, the N-Dimensional pixel data may be not be displayed by a processor. For example, a person (e.g., a system user or operator) may visually observe the N-Dimensional pixel data in the N images and present (e.g., manually draw) the N-Dimensional pixel data within the 2D space according to any of the methods described herein.

Figure 2:
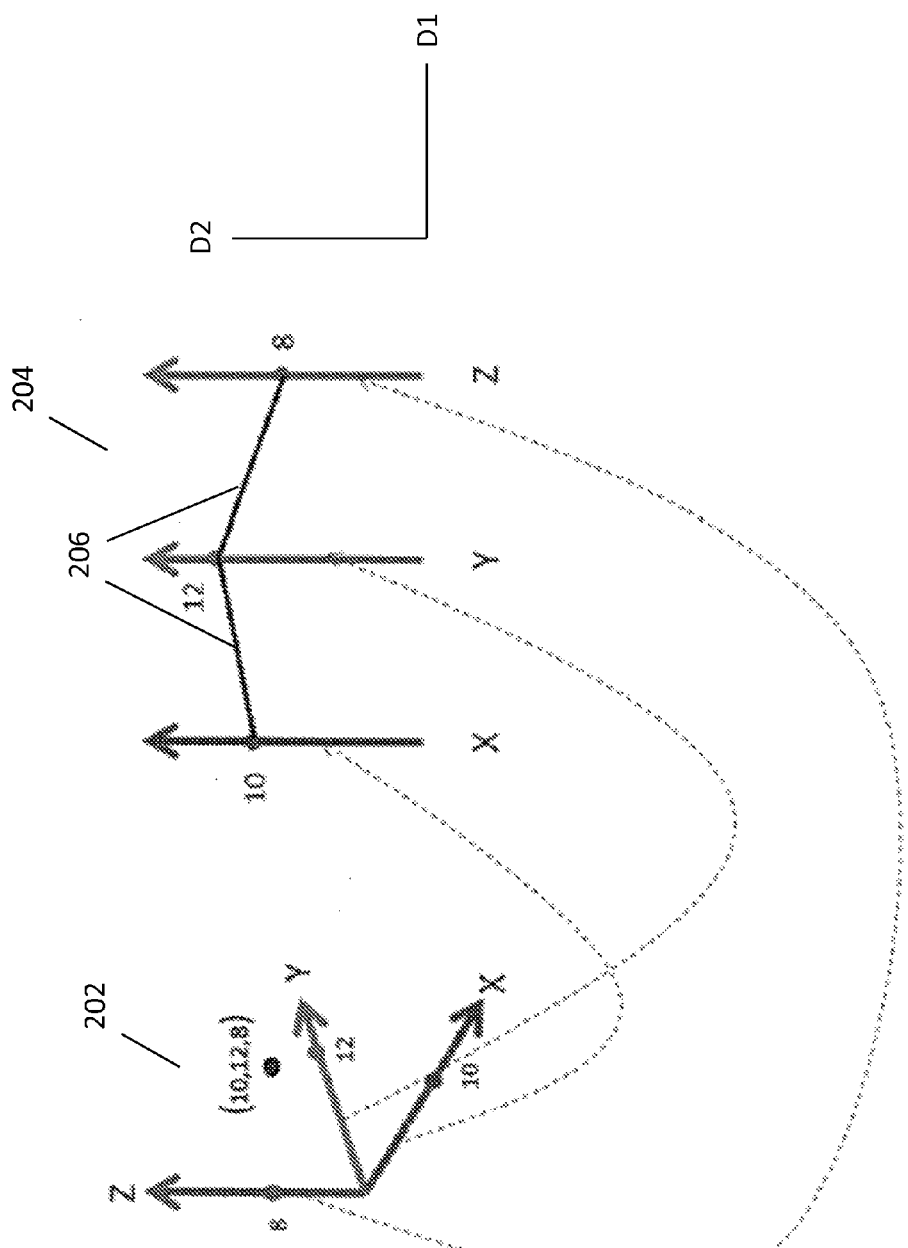
FIG. 2 is an illustration showing an exemplary method of converting three dimensional (3D) data from a 3D space to a 2D space which may be used with embodiments disclosed herein.

FIG. 2 is an illustration showing an exemplary method of converting 3D data from a 3D space 202 to an exemplary 2D space 204 which may be used with embodiments disclosed herein. Because it is difficult to visualize displays in more than three dimensions, the method of converting data from a 3D space 202 to an exemplary 2D space 202 shown in FIG. 2 is first described to explain methods of displaying pixel values in four or more dimensions (e.g., from four or more images provided by a quad energy Photon Counting CT system) within a 2D space, according to embodiments described herein.

The left side of FIG. 2 shows a 3D display 202 using a Cartesian coordinate system to display data from three images (3 dimensions) in a 3D space 202. As shown on the left side in FIG. 2, the Cartesian coordinate system includes axis X, axis Y and axis Z together defining a 3D space 202. Each axis (X, Y and Z) is a linear representation of pixel intensities of pixels in three corresponding images. As described above, each image corresponds to anatomy exposed to a range of photon energy. Accordingly, each pixel in an image corresponds to material at a location of the anatomy. Point 10 on the X-axis represents the pixel intensity of a pixel in the first image corresponding to material at a location of the anatomy. Point 12 on the Y-axis represents the pixel intensity of the corresponding pixel in the second image. Point 8 on the Z-axis represents the pixel intensity of the corresponding pixel in the third image. Accordingly, a 3D point (10, 12, 8) may be displayed within the 3D space to represent the pixel intensities in the 3 images corresponding to material exposed to the different ranges of photon energy.

Although not shown, any number of additional 3D points may be displayed in the exemplary 3D space 202 to represent pixel intensities in the three images corresponding to material exposed to the different ranges of photon energy. The 3D points may form clusters of 3D points corresponding to different materials (e.g., calcium, iodine and gold) exposed to the three ranges of photon energy. One or more planes (not shown) may be displayed in the 3D space 202 to separate the clusters of 3D points (e.g., pixel intensities of pixels from each image) corresponding to different materials (e.g., calcium, iodine and gold) exposed to the three ranges of photon energy.

The right side of FIG. 2 shows the data from three images displayed within a 2D space 204 according to an embodiment. The 2D space is defined by a first dimension D1 and the second dimension D2 (as opposed to the 3D space defined by the 3 intersecting axes X, Y and Z shown on the left side of FIG. 2). As shown on the right side of FIG. 2, the three axes (X, Y and Z) are displayed, within the 2D space 204, as linear representations of the pixel intensities. The pixel intensities (10, 12 and 8) correspond to material at the same location in anatomy exposed to three different ranges of photon energy. As shown in the 2D space 204, a continuous line 206 of interconnecting line segments is used to represent the pixel intensities (10, 12 and 8) in the 3 images corresponding to material exposed to the different ranges of photon energy instead of a 3D point used in the 3D space 202.

A quad energy Photon Counting CT system exposes anatomy to four different ranges of photon energy and provides an image of anatomy for each of the four different ranges of photon energy. FIG. 4 through FIG. 7 are exemplary illustrations of displays used to show methods of displaying the data from each of the four images (four dimensions) within a 2D space according to embodiments disclosed herein. Embodiments may, however, provide methods for displaying data from any number of images (any number of dimensions) within a 2D space.

Figure 3:
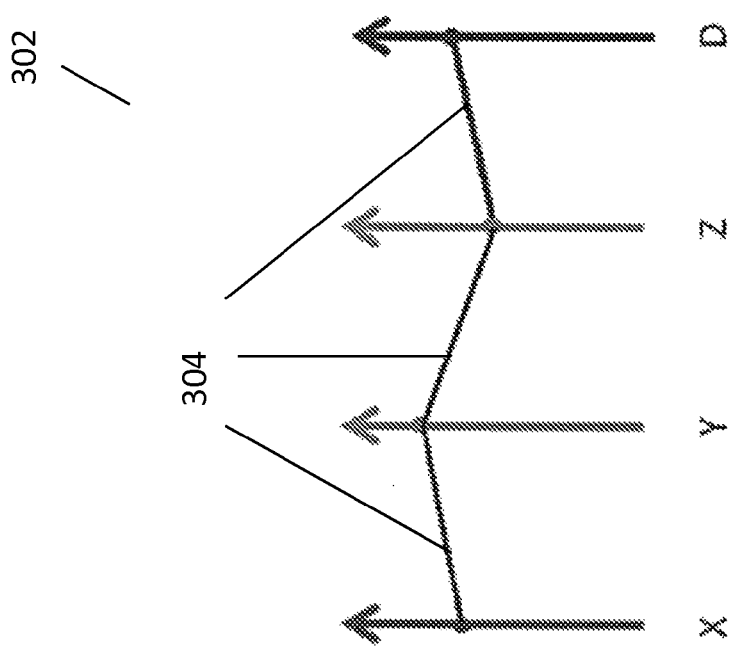
FIG. 3 is an illustration of data from four images displayed within an exemplary 2D space according to an embodiment.

FIG. 3 is an illustration of data from four images displayed within an exemplary 2D space 302 according to an embodiment. As shown at FIG. 3, four axes (X, Y, Z and D) are displayed, within the 2D space 302, as linear representations of the pixel intensities. Points along each axis indicate the pixel intensities in each image corresponding to the material exposed to four different ranges of photon energy. A continuous line 304, comprising a plurality of line segments, may intersect along each of the four axes (X, Y, Z and D) is used to represent the pixel intensities in the 4 images corresponding to a material at a location in the anatomy exposed to the four different ranges of photon energy. Additional lines may be displayed along each of the four axes (X, Y, Z and D) to represent the pixel intensities of the other pixels in the four images. Any number of continuous lines, such as line 304, may be displayed along each of the four axes (X, Y, Z and D) to represent the pixel intensities in the 4 images.

The linear axis (X, Y, Z and D) shown in FIG. 3 are spaced at equal distances from each other, are parallel with each other and have the same length. Embodiments may, however, include linear axes that are spaced from each other at a distance different from the distance shown in FIG. 3. Embodiments may also include linear axes that are spaced from each other at varying distances. Embodiments may include two or more linear axes that are not parallel with each other (e.g., angled with respect to each other). Embodiments may also include two or more linear axes having different lengths.

Figure 4:
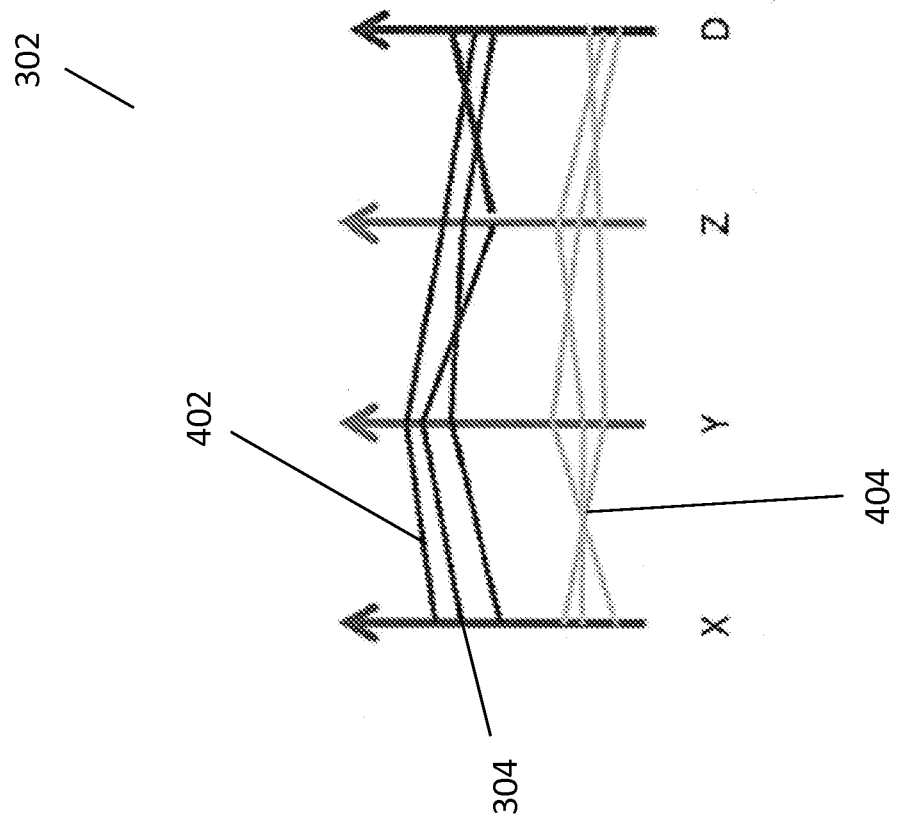
FIG. 4 is an illustration showing a display of exemplary line clusters representing pixel intensities from the four images within the 2D space shown in FIG. 3.

FIG. 4 is an illustration showing a display of exemplary line clusters 402 and 404 representing pixel intensities from the four images within the 2D space 302 shown in FIG. 3. As shown in FIG. 4, line clusters 402 and 404 each include three continuous lines (e.g., line 304 in cluster 402) of interconnecting line segments along each of the four axes (X, Y, Z and D). Each line represents pixel intensities in the 4 images corresponding to a material at a location in the anatomy exposed to the four different ranges of photon energy.

Line clusters may be used to distinguish between any number of different materials in the anatomy that are exposed to different ranges (e.g., four ranges) of photon energy. That is, the line clusters 402 and 404 may be used to distinguish between any number of different materials based on the different appearances (e.g., pixel intensities) of the materials in the four different images each corresponding to different ranges of photon energy. For explanation purposes, the line clusters 402 and 404 in FIG. 4 are now described to distinguish between gold and calcium in four images. Embodiments may, however, include any number of line clusters to distinguish between any number of materials other than gold and calcium. Embodiments may also include line clusters to distinguish between materials from any number of images of anatomy exposed to any number of ranges of photon energy.

Line cluster 402 includes lines interconnecting between higher pixel intensities. Line cluster 402 may indicate a first material (e.g., calcium) that appears brighter when exposed to each of the four ranges of photon energy. Line cluster 404 includes lines interconnecting between lower pixel intensities. Line cluster 404 may indicate a second material (e.g., calcium) that appears darker when exposed to each of the four ranges of photon energy. Accordingly, two different materials may be identified based on the location of the line clustering in the 2D space 302.

The number and location of the lines (e.g., line 304) shown in FIG. 4 are merely exemplary. Embodiments may include any number of lines at any location. The number and location of the of the line clusters 402 and 404 shown in FIG. 4 are also exemplary. Embodiments may include any number of line clusters at any location.

In some embodiments any number of different colors may be used to identify any number of axes. For example, each axis (X, Y, Z, . . . D) may comprise a different color. In some embodiments, color may be used to reflect low to high energy thresholds.

Figure 5:
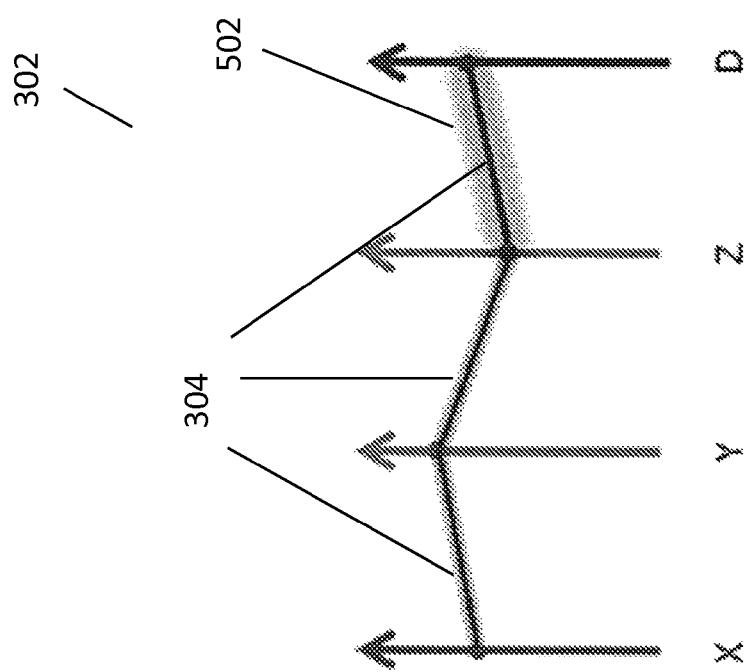
FIG. 5 is an illustration showing a segment of the line between axis Z and axis D comprising an identifier according to an embodiment according to an embodiment.

FIG. 5 is an illustration showing a segment of the line 304 between axis Z and axis D comprising an identifier according to an embodiment. One or more of the line segments may include an identifier (e.g., 502) indicating an uncertainty in the pixel values (e.g., pixel intensities) of one or both of the adjacent axes (e.g., Z and D) intersecting the one or more line segments. For example, the identifier shown in FIG. 5 is a blurred area 502 around the segment of line 304 between axis Z and axis D. Noise present in one or more images may indicate uncertainty in intensity values for pixels. The uncertainty may include a range, such as a plus or minus range. For example, if the pixel intensity on the Z-axis is 10 and the blurred area 502 includes an uncertainty range of plus or minus 2, the blurred area 502 indicates the pixel intensity on the Z-axis as 10 plus or minus 2.

Figure 6:
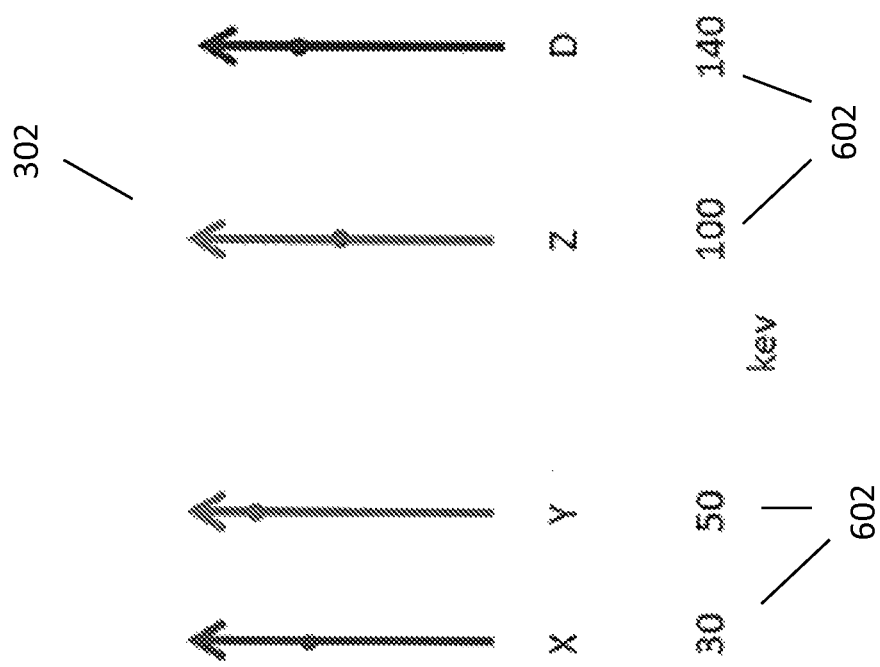
FIG. 6 is an illustration showing axes spaced at unequal distances from each other to indicate the relative differences in amounts of the different energy ranges, according to an embodiment.

FIG. 6 is an illustration showing the four axes (X, Y, Z and D) in the 2D space 302. The axes are spaced from each other at relative distances to indicate corresponding relative differences in the amounts of the different energy ranges, according to an embodiment. For example, the relative positions of the axes may represent relative closeness of the mean threshold value of the different energy ranges. As shown in FIG. 6, the mean threshold values 602 of the different energy ranges for the X-axis, the Y-axis, the Z-axis and the D-axis are shown as 30, 50, 100, and 140, respectively. The relative positions of the axes shown in FIG. 6 and the mean threshold values 602 shown in FIG. 6 are merely exemplary. Embodiments may include axes having different relative positions and any mean threshold values. The values 602 shown in FIG. 6 are in keV units. Embodiments may, however, include presenting energy values in other units of energy.

Figure 7:
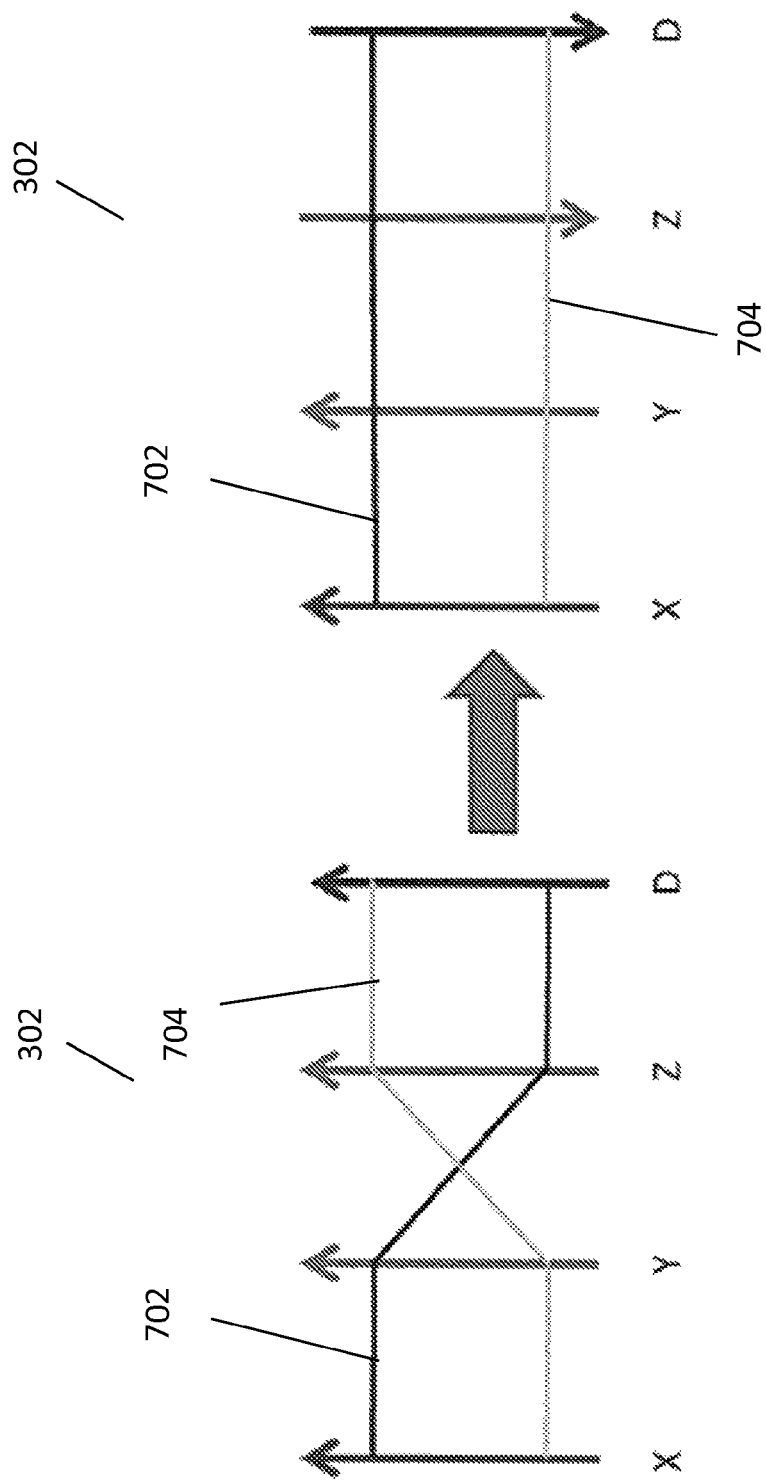
FIG. 7 is an illustration showing two axes flipped in different directions to provide separation of to facilitate distinguishing between different materials, according to an embodiment.

FIG. 7 is an illustration showing a method of flipping axes (Z and D) in an opposite directions to provide separation of the lines 702 and 704 to facilitate distinguishing between different materials, according to an embodiment. On the left side of FIG. 7, each of the four axes (X-axis, Y-axis, Z-axis and D-axis) face the same direction and the continuous lines 702 and 704 cross each other between the Y-axis and the Z-axis. As shown in the right side of FIG. 7, the Y-axis and Z-axis are flipped in different directions to provide separation of the continuous line 702 and the continuous line 704 to facilitate distinguishing between different materials. The illustration in FIG. 7 shows two lines 702 and 704 displayed within exemplary 2D spaces 302 to simplify explanation. It may be appreciated, however, that any number of lines may be presented within a 2D space and flipping of any number of axes may present separation of line clusters to facilitate distinguishing between different materials.

Characteristics of one or more materials may be determined based on the appearance of the pixel data displayed in the 2D space using any of the exemplary methods described with reference to FIG. 3 through FIG. 7. For example, as described below, the appearance of the pixel data displayed in the 2D space may be used to: (i) identify a particular material exposed to a number of energy ranges; (ii) classify a material according to its exposure to a corresponding number of energy ranges; (iii) determine whether to use Photon Counting CT (at any number of energy ranges) to scan a particular portion of anatomy; and (iv) distinguish between two or more materials exposed to a number of energy ranges.

In one embodiment, any of the exemplary methods of displaying multidimensional data in a 2D space described above with reference to FIG. 3 through FIG. 7 may be used to determine whether one or more materials exposed to a number of ranges of photon energy are in the scanned anatomy. Material classifiers may be used to determine whether the one or more materials exposed to the number of ranges of photon energy are in the scanned anatomy. Each material classifier is provided by displaying, in the 2D space using any of the methods described above with reference to FIG. 3 through FIG. 7, pixel data corresponding to a known material exposed to a predetermined number of photon energy ranges.

An exemplary method for determining a material exposed to four or more ranges of photon energy in a scanned anatomy is now described. For explanation purposes, the following example is limited to one material, iodine, exposed to four ranges of photon energy is present in a scanned anatomy. Embodiments may, however, include determining whether any material exposed to any number of ranges of photon energy is present in a scanned anatomy.

Prior to scanning the anatomy, an amount of iodine (e.g., iodine in a vial) is exposed to four ranges of photon energy. The location of the iodine pixel data in the image is easily identified because the location of the iodine relative to the scanner is predetermined. The iodine pixel data is displayed, in the 2D space using any of the methods described above with reference to FIG. 3 through FIG. 7. For example, displaying of the iodine pixel data may include using points along each of the four axes (X, Y, Z and D) to indicate the pixel intensities in each image corresponding to the iodine exposed to the four different ranges of photon energy. One or more continuous lines, such as 304 in FIG. 3, intersecting points along each of the four axes (X, Y, Z and D) may be used to represent the pixel intensities of the iodine in the four images. A plurality of continuous lines may form a line cluster indicating the pixel intensities of the iodine in the four images.

The presented line cluster is used to classify the predetermined material (e.g., iodine) according to exposure to the four ranges of photon energy and the location of the line cluster within the 2D space. In some embodiments, material classifiers may be presented using line clusters having any number of continuous lines. In some embodiments, material classifiers may be presented, in 2D spaces, using pixel data from more than one scan.

In some embodiments, the line cluster of the material classifier (e.g., iodine classifier) is equal to or within a luminance intensity range. For example, the luminance intensity range may be defined by a minimum luminance intensity value and maximum luminance intensity value along each of the N number of axes and the number of continuous lines in the material classifier may be equal to or within the luminance intensity range.

The iodine classifier may then be used to determine whether the one or more materials exposed to the number of ranges of photon energy are in the scanned anatomy. For example, after the iodine classifier is presented, the anatomy of a patient comprising one or more materials is scanned.

Pixel data for selected pixels corresponding to a material in the anatomy of a patient at the same location in each of the four images may be displayed in the 2D space using any of the methods described above with reference to FIG. 3 through FIG. 7. For example, a continuous line interconnecting the pixel intensities along each of the four axes (X, Y, Z and D) may be used to indicate the pixel intensities of the selected pixels. The material in the scanned anatomy may be determined to be iodine based on the iodine classifier. For example, the material may be determined to be iodine if the minimum and maximum points of the continuous line are equal to or within a pixel intensity range. The material may be determined to be iodine if the minimum point of the line is equal to or above an intensity threshold. The material may be determined to be iodine if the maximum point of the line is equal to or below an intensity threshold.

In some embodiments, a processor may determine whether the one or more materials exposed to the number of ranges of photon energy are in the scanned anatomy based on the iodine classifier. For example, a comparator (not shown) may compare the iodine classifier displayed within the 2D space to the pixel data from the selected pixels corresponding to the scanned anatomy displayed within the 2D space. In some aspects, the comparison may include using a threshold value between two different material classifiers and material from a scanned anatomy may be determined based on whether the continuous line representing the pixel data of the material is above or below the threshold line. The threshold value may be the same pixel value for each of the axes (e.g., a horizontal line extending between the iodine classifier and the selected pixel data corresponding to the scanned anatomy). The threshold value may also include different pixel values for each of the axes (e.g., a diagonal line extending between the iodine classifier and the selected pixel data corresponding to the scanned anatomy). In some aspects, a material in the scanned anatomy may be determined by a processor based on an image processing techniques, such as matching techniques. In some aspects, a material in the scanned anatomy may be determined based on identification by a person (e.g., user or system operator) observing the displayed classifier and the displayed pixel data corresponding to the material. The processor may receive compared pixel data from the comparator to determine whether the one or more materials exposed to the number of ranges of photon energy are in the scanned anatomy.

In other embodiments, a person such as a system user or operator, may determine whether the one or more materials exposed to the number of ranges of photon energy are in the scanned anatomy by visual observation of the iodine classifier displayed within the 2D space and the pixel data from the scanned anatomy displayed within the 2D space.

In some embodiments, the exemplary methods of displaying multidimensional data in a 2D space described above with reference to FIG. 3 through FIG. 7 may be used to determine whether to use Photon Counting CT to scan a particular portion (e.g., an organ) of a patient's anatomy when two or more materials exposed to a number of energy ranges appear visually distinct in the 2D space. For example, a predetermined organ in the anatomy may be exposed to a predetermined number of energy ranges. Pixel intensities of pixels corresponding to the organ in each of the four images may be displayed in the 2D space using any of the methods described above with reference to FIG. 3 through FIG. 7. Photon Counting CT may be determined to be used in future scans of the organ when the appearance of the pixel intensities corresponding to the organ displayed in the 2D space indicates different materials in the organ. For example, Photon Counting CT may be determined to be used in future scans of the organ when line clustering in the 2D space 302 indicates two different materials based on the location of the line clusters (e.g., distance between clusters) in the 2D space 302.

In some embodiments, the exemplary methods of displaying multidimensional data in a 2D space described above with reference to FIG. 3 through FIG. 7 may be used to determine whether to use a particular contrast agent in a Photon Counting CT scan. For example, a predetermined contrast agent may be injected in anatomy and a predetermined organ in the anatomy is exposed to a predetermined number of energy ranges. Pixel intensities of pixels corresponding to the organ in each of the four images may be displayed in the 2D space using any of the methods described above with reference to FIG. 3 through FIG. 7. Photon Counting CT may be determined to be used in future scans of an organ using the predetermined contrast agent when the pixel intensities of pixels corresponding to the organ displayed in the 2D space indicate different materials in the organ. Photon Counting CT may be determined to be not used in future scans if different materials are not indicated (e.g., two distinct line clusters). Accordingly, less expensive scans may be used for future scans of a particular organ and/or scans of a particular organ using a particular contrast agent.

In some embodiments, the exemplary methods of displaying multidimensional data in a 2D space described above with reference to FIG. 3 through FIG. 7 may be used to determine whether to use a particular number of energy ranges in a Photon Counting CT scan. For example, scans using four energy ranges may not provide different materials, but a scan of 6 or 8 energy levels may provide different materials as determined using any of the exemplary methods of displaying multidimensional data in a 2D space described herein.

The system and processes of the figures presented herein are not exclusive. Other systems, processes and menus may be derived in accordance with the embodiments of the invention to accomplish the same objectives. Although this invention has been described with reference to particular embodiments, it is not limited thereto and it is to be understood that the embodiments and variations shown and described herein are for illustration purposes only. Those skilled in the art will appreciate that numerous changes and modifications may be made to the preferred embodiments of the disclosure and that such changes and modifications may be made without departing from the true spirit of the disclosure. Any of the functions and steps provided in the Figures may be implemented in hardware, software or a combination of both. It is therefore intended that the appended claims covered be construed to all such equivalent variations as fall within the true spirit and scope of the disclosure. No claim element herein is to be construed under the provisions of 35 U.S.C. 112, sixth paragraph, unless the element is expressly recited using the phrase "means for."

What is claimed is:

1. A method of presenting higher dimensional data provided from a photon counting CT system, the method comprising:

receiving, via a processor, data from a photon counting CT system, the data corresponding to one or more materials exposed to N number of ranges of photon energy, where N is a number equal to or greater than four;

generating, via the processor, N number of images, each image comprising pixel values corresponding to the one or more materials exposed to the N number of ranges of photon energy; and presenting one or more of the pixel values in each of the N number of images within a two dimensional (2D) space by:
- providing N number of axes, each axis linearly representing the pixel values in a corresponding image of the N number of images; and
- representing each pixel value for pixels corresponding to a same location in each of the N number of images via a continuous line comprising a plurality of line segments, the continuous line intersecting points along each of the N number of axes,
- wherein one or more of the line segments comprises an identifier indicating an uncertainty in the pixel values of one or both of the adjacent axes intersecting the one or more line segments.

2. The method of claim 1, wherein the one or more of the pixel values in each of the N number of images are presented within the 2D space via the processor.

3. The method of claim 1, wherein presenting one or more of the pixel values in each of the N number of images within the 2D space further includes providing a first line cluster comprising a first plurality of continuous lines, each of the first plurality of continuous lines intersecting points along each of the N number of axes and corresponding to a first material exposed to N number of ranges of photon energy.

4. The method of claim 3, further comprising providing a material classifier, the material classifier identifying a material of the one or more materials according to exposure to the N number of ranges of photon energy by the location of the first line cluster within the 2D space.

5. The method of claim 4, wherein the one or more materials is within an anatomy of a patient exposed to the N number of ranges of photon energy, and
the method further comprises:
- comparing a material selected from the one or more materials within the anatomy to the material classifier; and
- determining whether the selected material is the material identified by the material classifier based on the comparing.

6. The method of claim 3, wherein
presenting one or more of the pixel values in each of the N number of images within the 2D space further includes providing a second line cluster comprising a second plurality of continuous lines, each of the second plurality of continuous lines intersecting points along each of the N number of axes and corresponding to a second material exposed to N number of ranges of photon energy, and
the second line cluster is spaced from the first line cluster in the 2D space.

7. The method of claim 6, further comprising determining two or more materials exposed to N number of ranges of photon energy based on the location of the first line cluster and the second line cluster.

8. The method of claim 7, further comprising performing a Photon Counting CT scan using the N number of ranges of photon energy based on the determination of two or more materials exposed to N number of ranges of photon energy.

9. The method of claim 1, wherein each of the N number of axes comprises a different color.

10. The method of claim 1, wherein the N number of axes are spaced from each other at relative distances to indicate corresponding relative differences in the N number of ranges of photon energy.

11. A method of classifying material scanned using a photon counting CT system, the method comprising:
performing a scan of a predetermined material exposed to N number of ranges of photon energy, where N is a number equal to or greater than four;
generating, via a processor, N number of images, each image comprising pixel values corresponding to the predetermined material exposed to the N number of ranges of photon energy; and
presenting one or more of the pixel values in each of the N number of images within a two dimensional (2D) space by:
- providing N number of axes, each axis linearly representing the pixel values in a corresponding image of the N number of images; and
- providing a line cluster comprising a plurality of continuous lines comprising a plurality of line segments, the plurality of continuous lines (i) representing pixel values corresponding to a same location in each of the N number of images and (ii) intersecting points along each of the N number of axes and corresponding to the predetermined material exposed to N number of ranges of photon energy, each of the points indicating a pixel value of the predetermined material in each corresponding image; and
using the presented line cluster to classify the predetermined material as a material classifier according to exposure to the N number of ranges of photon energy and the location of the line cluster within the 2D space,
wherein one or more of the line segments comprises an identifier indicating an uncertainty in the pixel values of one or both of the adjacent axes intersecting the one or more line segments.

12. The method of claim 11, wherein
the pixel values are luminance intensities, and
the line cluster in the material classifier is equal to or within a luminance intensity range.

13. The method of claim 12, wherein the luminance intensity range is defined by a minimum luminance intensity value and maximum luminance intensity value along each of the of the N number of axes and the number of continuous lines in the material classifier are equal to or within the luminance intensity range.

14. The method of claim 11, wherein the material classifier is configured to be compared to pixel data of a material in the N number of images from a scanned anatomy to determine whether the material is the predetermined material identified by the material classifier.

* * * * *